United States Patent
Fan et al.

(10) Patent No.: US 11,300,044 B2
(45) Date of Patent: Apr. 12, 2022

(54) ROTARY PISTON ENGINE

(71) Applicant: JIANGSU UNIVERSITY, Zhenjiang (CN)

(72) Inventors: Baowei Fan, Zhenjiang (CN);
Yuanguang Wang, Zhenjiang (CN);
Jianfeng Pan, Zhenjiang (CN);
Yaoyuan Zhang, Zhenjiang (CN);
Yonghao Zeng, Zhenjiang (CN);
Shaowen Liu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/169,466

(22) Filed: Feb. 7, 2021

(65) Prior Publication Data

US 2021/0164387 A1   Jun. 3, 2021

Related U.S. Application Data

(63) Continuation-in-part of application No. PCT/CN2019/107200, filed on Sep. 23, 2019.

(30) Foreign Application Priority Data

Jul. 29, 2019 (CN) .......................... 201910689328.1
Jul. 23, 2020 (CN) .......................... 202010715230.1

(51) Int. Cl.
*F02B 53/04* (2006.01)
*F02B 55/14* (2006.01)
(Continued)

(52) U.S. Cl.
CPC .............. *F02B 53/04* (2013.01); *F02B 55/14* (2013.01); *F02B 55/02* (2013.01); *F02B 2053/005* (2013.01); *F02B 2075/027* (2013.01)

(58) Field of Classification Search
CPC .......... F02B 53/04; F02B 55/14; F02B 55/02; F02B 55/16; F02B 53/00; F02B 55/08
(Continued)

(56) References Cited

U.S. PATENT DOCUMENTS

| 9,664,106 B2 * | 5/2017 | Chiang ..................... F01C 1/39 |
| 2009/0133665 A1 * | 5/2009 | Ambardekar ........... F02B 53/00 123/245 |

(Continued)

FOREIGN PATENT DOCUMENTS

| CN | 1546853 A | 11/2004 |
| CN | 101939508 A | 1/2011 |

(Continued)

*Primary Examiner* — J. Todd Newton
(74) *Attorney, Agent, or Firm* — Bayramoglu Law Offices LLC

(57) ABSTRACT

A rotary piston engine is provided. The rotary piston engine includes a shell and a rotor, the rotating rotor is arranged in the shell and divides a rotor cavity into compression chambers with a variable volume, a plurality of combustion chambers rotating around a main shaft of the rotor are arranged on an outer ring of the shell, and any one of the plurality of combustion chambers is communicated with the compression chambers; the plurality of combustion chambers are in a transmission connection with the main shaft of the rotor via a transmission system, and each of the plurality of combustion chambers drives the main shaft of the rotor to rotate by a combustion of a compressed combustible gas mixture. The shell includes an upper cylinder cover and a lower cylinder cover, and a boss of the upper cylinder cover is fitted with a spigot of the lower cylinder cover.

16 Claims, 17 Drawing Sheets

(51) Int. Cl.
*F02B 55/02* (2006.01)
*F02B 53/00* (2006.01)
*F02B 75/02* (2006.01)

(58) Field of Classification Search
USPC ............... 123/18 A, 18 R, 43 A, 45 A, 45 R, 123/200–249; 418/140, 418, 187, 61.1
See application file for complete search history.

(56) References Cited

U.S. PATENT DOCUMENTS

2010/0192904 A1* 8/2010 Tuncer ................... F01C 1/356
123/234
2016/0115863 A1 4/2016 Gitelis

FOREIGN PATENT DOCUMENTS

| CN | 202065058 U | 12/2011 | |
|---|---|---|---|
| CN | 104373206 A | 2/2015 | |
| CN | 107218122 A | 9/2017 | |
| CN | 108691642 A * | 10/2018 | ............. F02B 53/00 |
| CN | 109026366 A | 12/2018 | |
| RU | 2666716 C1 * | 9/2018 | ............. F01C 19/08 |

* cited by examiner

ROTARY PISTON ENGINE

CROSS REFERENCE TO THE RELATED APPLICATIONS

This application is a continuation-in-part application of International Application No. PCT/CN2019/107200, filed on Sep. 23, 2019, which is based upon and claims priority to Chinese Patent Application No. 201910689328.1, filed on Jul. 29, 2019, and Chinese Patent Application No. 202010715230.1, filed on Jul. 23, 2020, the entire contents of which are incorporated herein by reference.

TECHNICAL FIELD

The present invention relates to the technical field of internal combustion engines, in particular to a rotary piston engine.

BACKGROUND

Internal combustion engines may be categorized into various types according to the specific structure and movement pattern thereof, among which two most widely used types of internal combustion engines are: Wankel rotary engines and reciprocating piston engines. The two types of engines have their own advantages and disadvantages. Wankel rotary engines have inherent advantages of simple structure, fewer parts and high power-to-weight ratio. However, it is undeniable that Wankel rotary engines involve problems such as high fuel consumption and high emission, which limit the further development thereof. It is well known that the main reason for the above-mentioned drawbacks of Wankel rotary engines is that the special structure and movement pattern of this type of rotary engines result in a very long and narrow combustion chamber, in which the fuel and air cannot be mixed and combusted well. Consequently, the long and narrow combustion chamber of the rotary engine restricts the improvement of the combustion efficiency of the whole engine. Compared with Wankel rotary engines, reciprocating piston engines have apparently higher combustion efficiency because they do not employ a long and narrow combustion chamber. However, the parts and movement pattern of reciprocating piston engines are more complex than that of Wankel rotary engines. As a result, reciprocating piston engines are larger in size and have a lower power-to-weight ratio.

SUMMARY

To overcome the drawbacks in the prior art, the present invention provides a rotary piston engine, which solves the problem of the originally long and narrow combustion chamber of the conventional Wankel rotary engine, to shorten the combustion duration of the engine and increase the combustion efficiency.

The above technical object of the present invention is attained with the following technical means:

A rotary piston engine, comprises a shell and a rotor, wherein a rotating rotor is arranged in the shell and divides a rotor cavity into compression chambers with variable volume, a plurality of combustion chambers which can rotate around a main shaft of the rotor are arranged on an outer ring of the shell, and any one of the combustion chambers is communicated with the compression chambers; the combustion chambers are in a transmission connection with the main shaft of the rotor via a transmission system, and each of the combustion chambers drives the main shaft of the rotor to rotate by combustion of compressed gas.

Further, the shell comprises an upper cylinder cover and a lower cylinder cover, and a boss of the upper cylinder cover is fitted with a spigot of the lower cylinder cover; a rotatable piston gear plate is arranged between the upper cylinder cover and the lower cylinder cover, support blocks are evenly distributed on an inner ring of the piston gear plate, and the support blocks are in contact with the boss in a manner of a rolling pair; a cavity among the boss, the lower cylinder cover and adjacent two of the support blocks is any one of the combustion chambers; the piston gear plate is in transmission connection with the main shaft of the rotor via the transmission system.

Further, a bottom of each of the support blocks is in contact with a surface of the boss in a manner of a rolling pair;

two end faces of the piston gear plate are respectively connected with the upper cylinder cover and the lower cylinder cover via a plane bearing.

Further, a wall surface of the rotor cavity is provided with a roller groove, a cylinder bearer is arranged in the roller groove, a first pin roller is mounted at a bottom of the cylinder bearer, and a first spring is mounted between the roller groove and the cylinder bearer for keeping the first pin roller in contact with the outer surface of the rotor during the rotation of the rotor.

Further, a first sealing assembly is provided between each of the two end faces of the piston gear plate and a respective one of the upper cylinder cover and the lower cylinder cover, and a second sealing assembly is provided on each of the support blocks, thus each of the combustion chambers is sealed by means of the second sealing assembly and the first sealing assembly.

Further, a directional valve is mounted on the upper cylinder cover near a spark plug, and one end of the directional valve is located inside one of the combustion chambers which is close to the spark plug for causing the combustion chamber close to the spark plug to rotate in a fixed direction and causing a volume of the combustion chamber to change periodically; the other end of the directional valve is connected with the piston gear plate via a rotary slider mechanism for causing the directional valve to avoid the rotating support blocks and undergo lifting movement.

Further, the rotary slider mechanism comprises a protruding disk and guide blocks; the guide blocks having the same phase angle as the support blocks are provided on the protruding disk, the protruding disk rotates synchronously with the piston gear plate, and during synchronous rotation, any one of the guide blocks is in contact with the other end of the directional valve to lift the directional valve up; the directional valve is provided with a restoring mechanism for retracting the directional valve.

Further, the rotary piston engine further comprises an exhaust device, which is a single-action reset piston device and mounted on the shell, and a piston of the exhaust device can extend into any one of the combustion chambers for forced exhaust by rotation of the combustion chambers.

Further, the exhaust device comprises a piston rod, a second return spring and a cam mechanism; the shell is provided with a piston rod groove in communication with any one of the combustion chambers, the piston at one end of the piston rod can enter any one of the combustion chambers through the piston rod groove, the other end of the piston rod is connected with the cam mechanism, and the piston rod reciprocates in the piston rod groove under the action of the cam mechanism; the second return spring is mounted on the piston rod to ensure that the other end of the piston rod is in contact with the cam mechanism.

Further, the exhaust device comprises a paddle plate and a second spring, a paddle groove is provided on a stepped surface of the boss, one end of the paddle plate is mounted in the paddle groove by a revolute pair, and the second spring is provided between the paddle groove and the paddle plate for causing the other end of the paddle plate to contact an inner wall of any one of the combustion chambers.

The beneficial effects of the present invention are as follows:

1. By the rotation of the combustion chambers, the rotary piston engine according to the present invention overcomes the drawback of the narrow and long combustion chamber in conventional Wankel rotary engines, and the combustion efficiency of the engine is improved.

2. The rotary piston engine according to the present invention can forcibly exhaust the waste gas generated in the combustion process by means of the exhaust device, thus preventing the combustion products from affecting the entry and filling of the fresh mixed gas.

3. The rotary piston engine according to the present invention causes the combustion chamber close to the spark plug to change periodically by means of the directional valve, so that the combustion chambers can rotate only in a particular direction.

In the figures:
1—rotor; 2—compression chamber; 3—main shaft of the rotor 1; 4—combustion chamber; 5—compressed gas passage; 6—upper cylinder cover; 7—lower cylinder cover; 8—boss; 9—spigot; 10—piston gear plate; 11—seat ring; 12—shaft washer; 13—valve; 14—spark plug; 15—support block; 16—first sealing assembly; 17—second sealing assembly; 18—first outer gear; 19—second outer gear; 20—third outer gear; 21—first spring; 22—cylinder bearer; 23—first pin roller; 24—third sealing assembly; 25—directional valve groove; 26—round hole slot; 27—fourth sealing assembly; 28—directional valve; 29—second pin roller; 30—fifth sealing assembly; 31—protruding disk; 32—guide block; 33—first return spring; 34—gas exhaust passage; 35—paddle plate; 36—paddle groove; 37—second spring; 38—third pin roller; 39—gas intake passage; 41—piston rod; 42—second return spring; 43—piston rod groove; 44—first bevel gear; 45—second bevel gear; 46—cam; 47—sixth sealing assembly.

DETAILED DESCRIPTION OF THE EMBODIMENTS

Hereunder the present invention will be further described in detail with reference to drawings and embodiments, but the protection scope of the present invention is not limited thereto.

Figure 1:
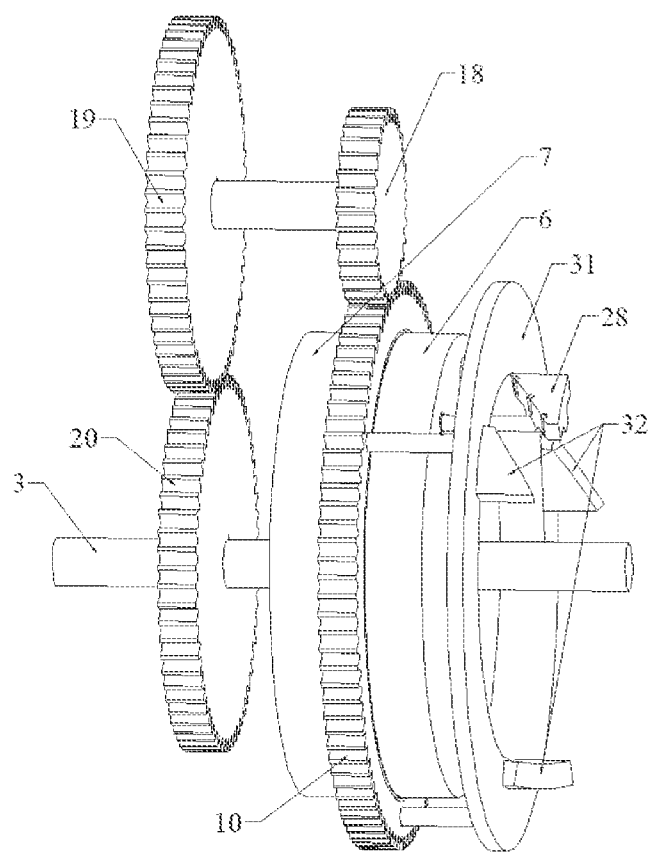
FIG. 1 is an assembly view of the rotary piston engine according to the present invention.
Figure 2:
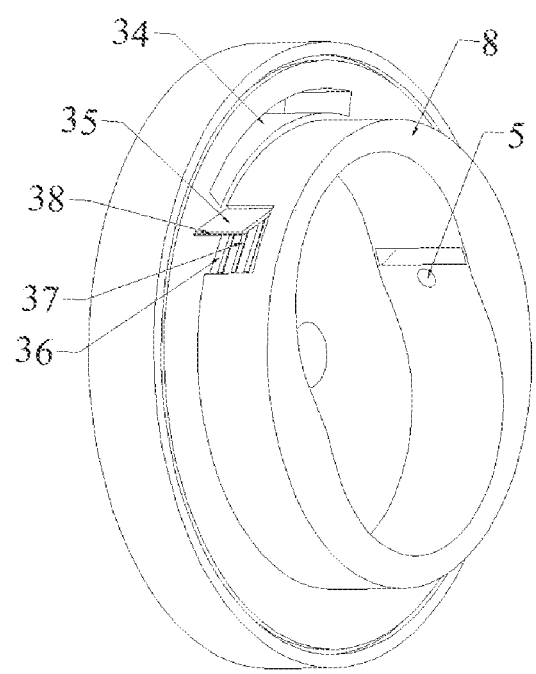
FIG. 2 is a schematic structural view of an upper cylinder cover according to the present invention.
Figure 4:
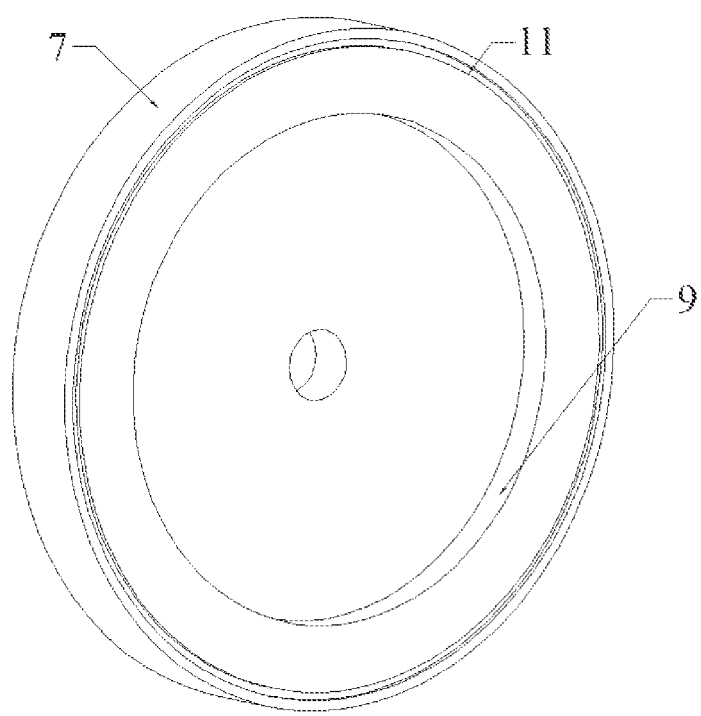
FIG. 4 is a schematic structural view of a lower cylinder cover according to the present invention.

As shown in FIGS. 1, 2 and 4, the rotary piston engine according to the present invention comprises a shell and a rotor 1, wherein the shell comprises an upper cylinder cover 6 and a lower cylinder cover 7, the rotating rotor 1 is arranged in the upper cylinder cover 6, and the rotor 1 divides a shell cavity into three compression chambers 2 with variable volume. In this embodiment, the structures of the shell cavity and the rotor 1 are the same as those of the cylinder and rotor of a conventional Wankel rotary engine, details will not be described herein again.

Figure 3:
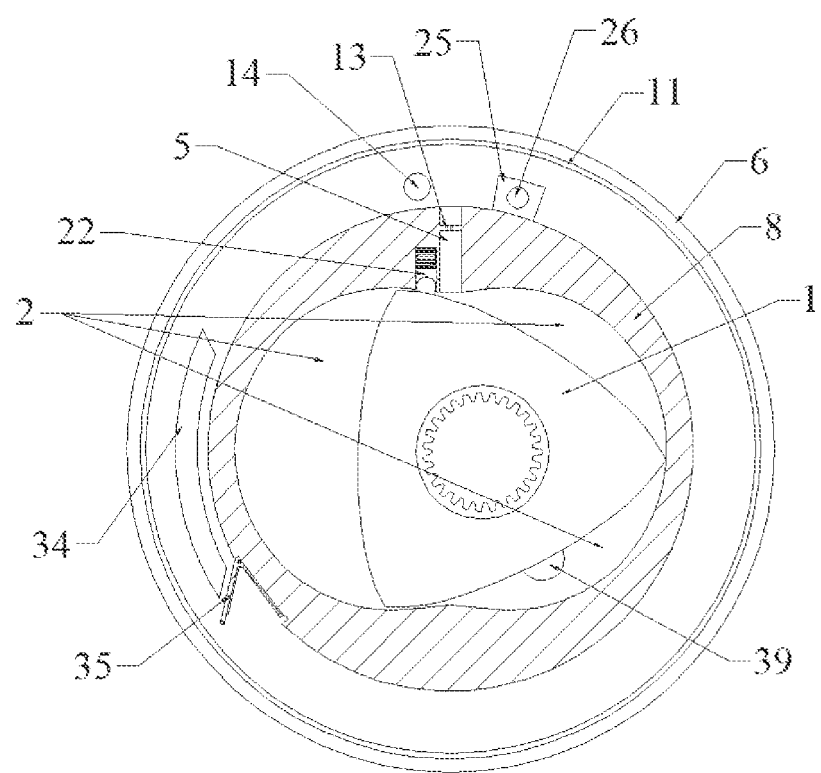
FIG. 3 is a sectional view of the upper cylinder cover according to the present invention.
Figure 5:
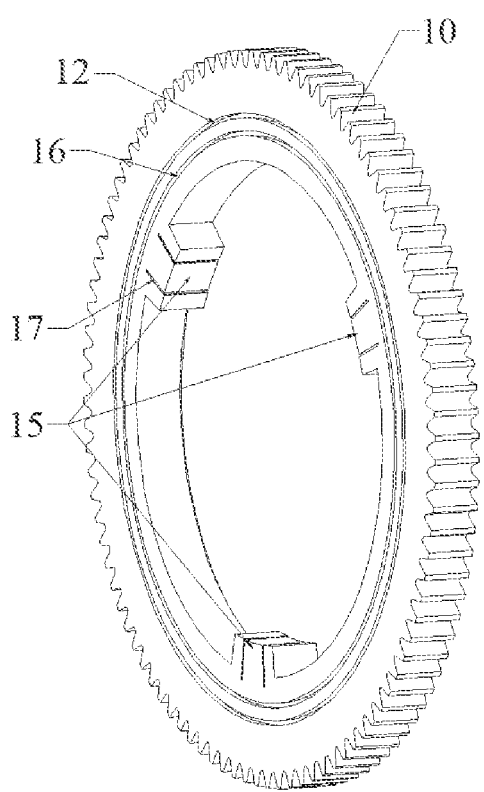
FIG. 5 is a schematic structural view of the piston gear plate according to the present invention.

The specific structure is as follows: as shown in FIGS. 3, 4 and 5, a boss 8 is provided on the upper cylinder cover 6, and the boss 8 is fitted with a spigot 9 on the lower cylinder cover 7; A seat ring 11 is arranged on an outer ring of an inner side surface of the upper cylinder cover 6, and a seat ring 11 is arranged on an outer ring of an inner side surface of the lower cylinder cover 7. A rotatable piston gear plate 10 is arranged between the upper cylinder cover 6 and the lower cylinder cover 7, and the piston gear plate 10 is sleeved on a stepped surface of the boss 8. A shaft washer 12 is arranged on each of two end faces of the piston gear plate 10. In order to reduce the friction between the piston gear plate 10 and the upper cylinder cover 6 and the lower cylinder cover 7, the two end faces of the piston gear plate 10 are respectively connected with the seat ring 11 on the upper cylinder cover 6 and the seat ring 11 on the lower cylinder cover 7 via a plane bearing. The upper cylinder cover 6 is provided with a compressed gas passage 5 in communication with the compression chamber 2, wherein the compressed gas passage 5 is located at the top and center of the boss 8, a valve 13 is provided in the compressed gas passage 5, and the opening and closing of valve 13 can be automatically controlled by a crank angle signal received by an electronic control system. The upper cylinder cover 6 is provided with a spark plug 14, wherein the spark plug 14 is located on the left of the compressed gas passage 5. A gas exhaust passage 34 is arranged on the stepped surface of the boss 8, wherein the gas exhaust passage 34 is an elongated arc-shaped gas passage. The lower cylinder cover 7 is provided with the spigot 9, wherein the spigot 9 is configured to be fitted with the boss 8.

As shown in FIG. 5, the piston gear plate 10 is an outer gear ring, and three support blocks 15 are evenly distributed on an inner ring of the piston gear plate 10. The support blocks 15 are in contact with the boss 8 in a manner of a rolling pair; a plurality of pin rollers are mounted at the bottom of each of the support blocks 15, and the pin rollers are in contact with the boss 8 in a manner of a rolling pair; alternatively, steel balls or needle rollers may be mounted at the bottom of the support block 15. A cavity among the boss 8, the lower cylinder cover 7 and adjacent two of the support blocks 15 is a combustion chamber 4; the piston gear plate 10 is in transmission connection with the main shaft 3 of the rotor 1 via the transmission system. A first sealing assembly 16 is arranged on an outer ring of each of the two end faces of the piston gear plate 10. A second sealing assembly 17 is provided on two end faces and a bottom face of the support block 15 for sealing the combustion chamber 4. The first sealing assembly and the second sealing assembly each comprise an oil scraper ring and a seal ring.

As shown in FIG. 1, the piston gear plate 10 is in transmission connection with the main shaft 3 of the rotor 1 via the transmission system. The transmission system is in a gear train transmission. The gear train comprises a first outer gear 18, a second outer gear 19, a third outer gear 20 and a connecting shaft; the third outer gear 20 is mounted on the main shaft 3 of the rotor 1, the piston gear plate 10 is engaged with the first outer gear 18, the first outer gear 18 is connected with the second outer gear 19 via the connecting shaft, and the second outer gear 19 is engaged with the third outer gear 20. In order to achieve the purpose that one revolution of the piston gear plate 10 effects one revolution of the rotor 1, the gear ratio of the piston gear plate 10 and the first outer gear 18 is 3:1, and the gear ratio of the second outer gear 19 and the third outer gear 20 is 1:1.

Figure 6:
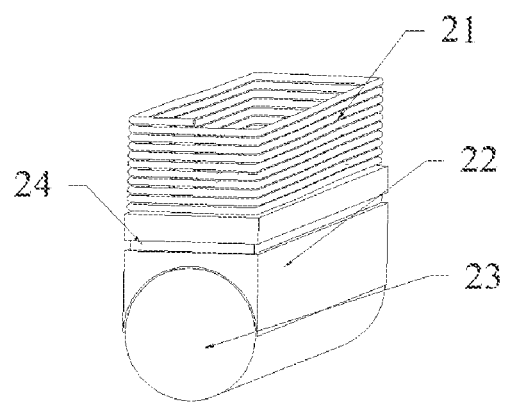
FIG. 6 is a structural view of the cylinder bearer according to the present invention.

As shown in FIGS. 3 and 6, in order to completely compress the mixed gas in the compression chamber 2 into the combustion chamber 4, a roller mounting groove is provided on the cylinder body on the left of the compressed gas passage 5, and starting from the bottom of the roller mounting groove, a first spring 21, a cylinder bearer 22 and a first pin roller 23 are mounted in sequence in the roller mounting groove. The contact surface between the cylinder bearer 22 and the first pin roller 23 is arc-shaped, which facilitates the rolling of the first pin roller 23 on the cylinder bearer 22. A third sealing assembly 24 is provided around the cylinder bearer 22 for sealing. The first pin roller 23 remains in contact with the outer surface of the rotor 1 under the action of the first spring 21.

Figure 7:
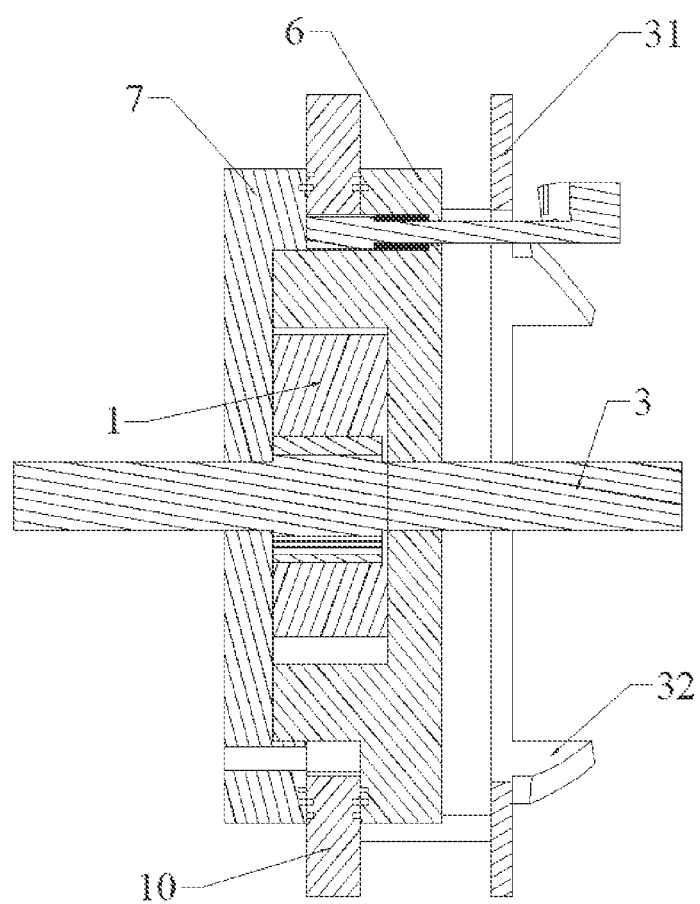
FIG. 7 is a sectional view of the rotary piston engine according to the present invention.
Figure 8:
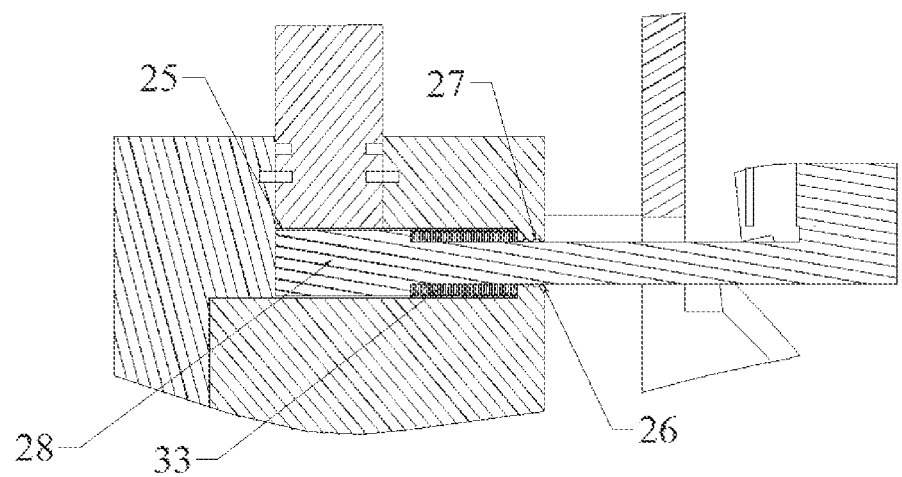
FIG. 8 is a partial enlarged view of the directional valve according to the present invention.
Figure 9:
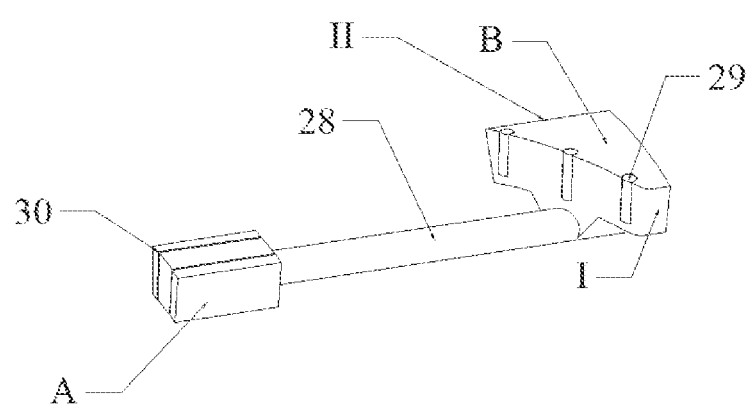
FIG. 9 is a three-dimensional view of the directional valve according to the present invention.
Figure 15:
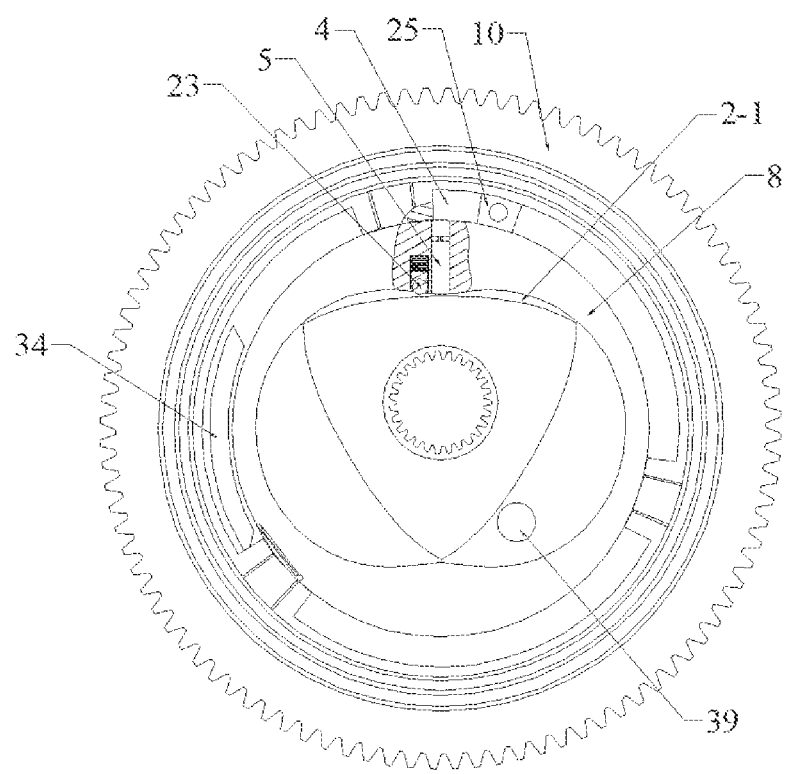
FIG. 15 is a schematic view of a certain moment in the compressed gas intake process.

As shown in FIGS. 1, 7 and 8, in order to ensure that the rotation direction of the combustion chamber 4 is fixed, a directional valve groove 25 is provided on the upper cylinder cover 6 near the spark plug 14, and the distance between the upper and lower end faces of the directional valve groove 25 is the same as the distance between the upper and lower end faces of the combustion chamber 4, the directional valve groove 25 is in communication with the outside of the shell via the round hole slot 26, and a fourth sealing assembly 27 is provided in a round hole slot 26 for sealing between the directional valve 28 and the combustion chamber 4. The directional valve 28 is mounted in the directional valve groove 25, and one end of the directional valve 28 is located inside the combustion chamber 4 close to the spark plug 14 for causing the volume of the combustion chamber 4 close to the spark plug 14 to change periodically and causing the combustion chamber to rotate in a fixed direction; The directional valve 28 divides the combustion chamber 4 into two parts, wherein one part of the combustion chamber 4 comprises the spark plug 14 and the compressed gas passage 5, and the other part is the rest of the combustion chamber 4. As shown in FIG. 15, the directional valve 28 divides the combustion chamber 4 into left and right parts. The left part of the combustion chamber 4 comprises the spark plug 14 and the compressed gas passage 5. At this point, the left part of the combustion chamber 4 is the real combustion chamber to cause the combustion chamber 4 to rotate in a fixed direction during operation. The right part of the combustion chamber 4 does not function as a combustion chamber. The other end of the directional valve 28 is connected with the piston gear plate 10 via a rotary slider mechanism for causing the directional valve 28 to avoid the rotating support blocks 15 and undergo lifting movement. As shown in FIG. 9, the size and shape of the end A of the directional valve 28 match those of the directional valve groove 25, the end B of the directional valve 28 is located outside the shell, the end A and end B of the directional valve 28 are threadedly connected by a connecting shaft, and the shaft is mounted in the round hole slot 26. A fifth sealing assembly 30 is provided on the upper and lower end faces and the front end face of the end A of the directional valve 28 for sealing the left and right sides of the directional valve 28 in normal state. The rotary slider mechanism comprises a protruding disk 31 and guide blocks 32; the guide blocks 32 having the same phase angle as the support blocks 15 are provided on the protruding disk 31; the protruding disk 31 and the piston gear plate 10 are threadedly connected to the outside of the shell by a plurality of connecting shafts, the protruding disk 31 rotates synchronously with the piston gear plate 10, and during the synchronous rotation, any one of the guide blocks 32 is in contact with the other end of the directional valve 28 to lift the directional valve 28 up; and the directional valve 28 is provided with a restoring mechanism for retracting the directional valve 28. As shown in FIG. 9, the outer end face of each of the guide blocks 32 is an inclined surface, and is fitted with an inclined surface at the other end of the directional valve 28, that is, an inclined surface at the end B in the figure. During the rotation of the protruding disk 31 along with the piston gear plate 10, when the support block 15 is about to pass one end of the directional valve 28, that is, end A in FIG. 9, the inclined surface of the guide block 32 is in contact with the inclined surface of the end B of the directional valve 28, the protruding disk 31 continues to rotate, and the guide block 32 continuously contacts the inclined surface of the end B of the directional valve 28 and then moves away, during which process the two inclined surfaces become staggered with each other, and the end B of the directional valve 28 is forced to be pulled up, so that the support block 15 can pass smoothly. The initial contact position between the guide block 32 and the end B of the directional valve 28 is arc-shaped, to ensure the unimpeded contact between the guide block 32 and the end B of the directional valve 28. A second pin roller 29 is provided on the inclined surface of the end B of the directional valve 28 to reduce the friction between the guide block 32 and the directional valve 28. In addition, a first return spring 33 is mounted between the end A of the directional valve 28 and the round hole slot 26, so as to ensure that the directional valve 28 can be reset smoothly after being pulled up, and to ensure that the end A of the directional valve 28 is in contact with the lower cylinder cover 7 and the piston gear plate 10 in normal state.

As shown in FIG. 2, the exhaust passage 34 is located on the upper cylinder cover 6, and the exhaust passage 34 is a long arc-shaped gas passage. After the combustion chamber 4 becomes in communication with the exhaust passage 34 as the piston gear plate 10 rotates, exhaust gas is naturally discharged via the exhaust passage 34. In addition, due to the fast rotational speed of the engine, a part of the exhaust gas cannot be naturally discharged from the exhaust passage 34 in time. In order to discharge this part of exhaust gas, the present invention further comprises an exhaust device.

FIGS. 2 and 3 show Embodiment 1 of the exhaust device of the present invention. The forced exhaust device comprises a paddle plate 35, a paddle groove 36 and a second spring 37. The paddle groove 36 is located on the stepped surface of the boss 8. One end of the paddle plate 35 is fixed in the paddle groove 36, and the paddle plate 35 can rotate up and down around the fixed end, and a third pin roller 38 is provided diagonally above the other end of the paddle plate 35. One end of the second spring 37 is mounted in the paddle groove 36, and the other end is connected to the lower end face of the paddle plate 35. In normal state, the third pin roller 38 on the paddle plate 35 remains in contact with the inner surface of the combustion chamber 4 under the action of the second spring 37. When the support block 15 passes the position of the paddle plate 35, the paddle plate 35 is pushed by the support block 15 to fall back into the paddle groove 36 to ensure that the support block 15 can pass through. When the support block 15 passes over the position of the paddle plate 35, the paddle plate 35 springs up again under the action of the second spring 37 to contact the inner surface of the combustion chamber, so that the exhaust gas in the combustion chamber 4 is forcibly discharged via the exhaust passage 34 during the rotation of the piston gear plate 10.

Figure 10:
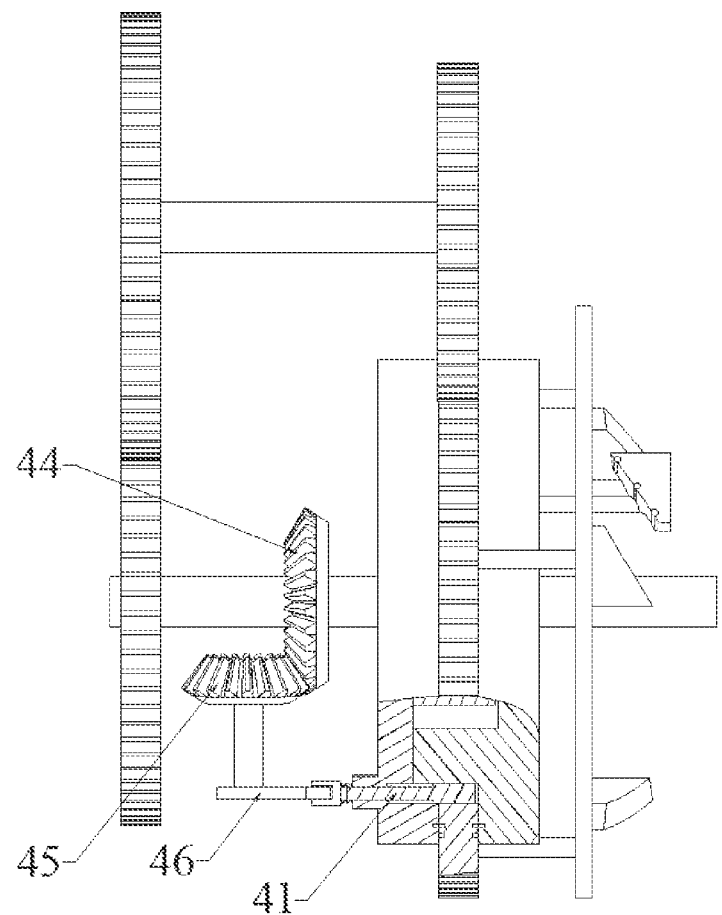
FIG. 10 shows the exhaust device in Embodiment 2.
Figure 11:
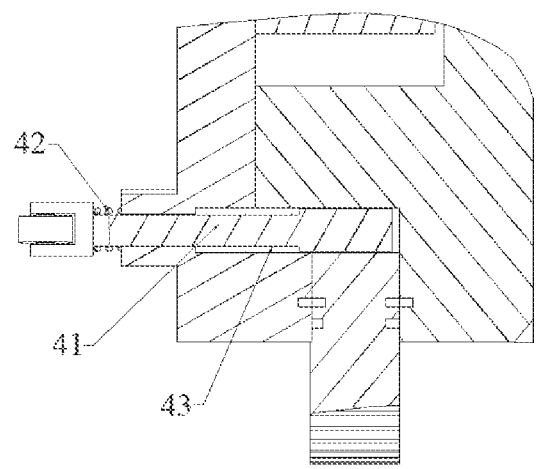
FIG. 11 is a partial enlarged view of FIG. 10.
Figure 12:
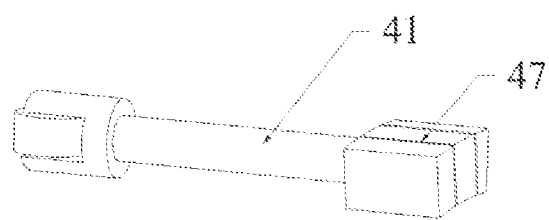
FIG. 12 is a three-dimensional view of the piston rod according to the present invention.

FIGS. 10, 11 and 12 show Embodiment 2 of the exhaust device of the present invention. The exhaust device comprises a piston rod 41, a return spring 42 and a cam mechanism; the lower cylinder cover 8 is provided with a piston rod groove 43 in communication with any one of the combustion chambers 4, the piston at one end of the piston rod 41 is mounted in the combustion chamber 4, and the piston is in appropriate size and shape to divide the combustion chamber 4 into front and rear parts which do not communicate with each other; a sixth sealing assembly 47 is provided on the outer surface of the piston at one end of the piston rod 41 for sealing the combustion chambers on the two sides of the piston. A roller at the other end of the piston rod 41 is connected with the cam mechanism, and the piston rod 41 reciprocates in the piston rod groove 43 by means of the cam mechanism; the return spring 42 is mounted on the piston rod 41 to ensure that the other end of the piston rod 41 is in contact with the cam mechanism. An input end of the cam mechanism is in transmission connection with the main shaft 3 of the rotor 1. The cam mechanism comprises a first bevel gear 44, a second bevel gear 45 and a cam 46, wherein the cam 46 is in contact with a roller at the other end of the piston rod 41 in a manner of a rolling pair, the cam 46 is connected with the second bevel gear 45 via a connecting shaft, the first bevel gear 44 is mounted on the main shaft 3 of the rotor 1, and the first bevel gear 44 is engaged with the second bevel gear 45. The function of the cam 46 is to ensure that the piston at one end of the piston rod 41 is always in the combustion chamber from the beginning to the end of the exhaust stroke, so as to achieve an effect of forced exhaust; and also ensure that when the support block 15 passes, the piston at one end of the piston rod 41 exits the combustion chamber 4 under the action of the return spring 42 and the cam 46.

The specific operating stokes are as follows:

The operating process of the rotary piston engine according to the present invention comprises four strokes, i.e., an intake stroke, a compression stroke, a combustion stroke and an exhaust stroke. Hereunder the entire operating process of the engine will be described in an embodiment of the four strokes of the rotary piston engine by taking the compression chamber 2 as an example.

Figure 13:
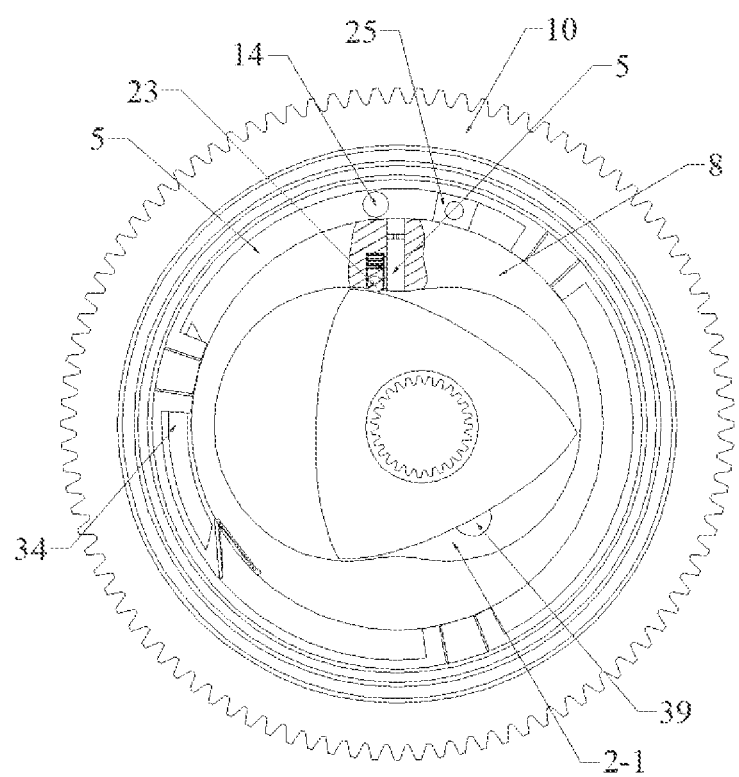
FIG. 13 is a schematic view of a certain moment in the intake process.

The intake stroke of the rotary piston engine according to the present invention is implemented as follows: when the gas intake passage 39 of the upper cylinder cover 6 is in communication with any one of the three compression chambers 2, fresh combustible gas mixture enters the compression chamber 2 through the gas intake passage 39 in the upper cylinder cover 6 first, and thus the intake process in the air intake stroke of the engine according to the present invention is realized. FIG. 13 is a schematic view of a certain moment in the intake stroke.

Figure 14:
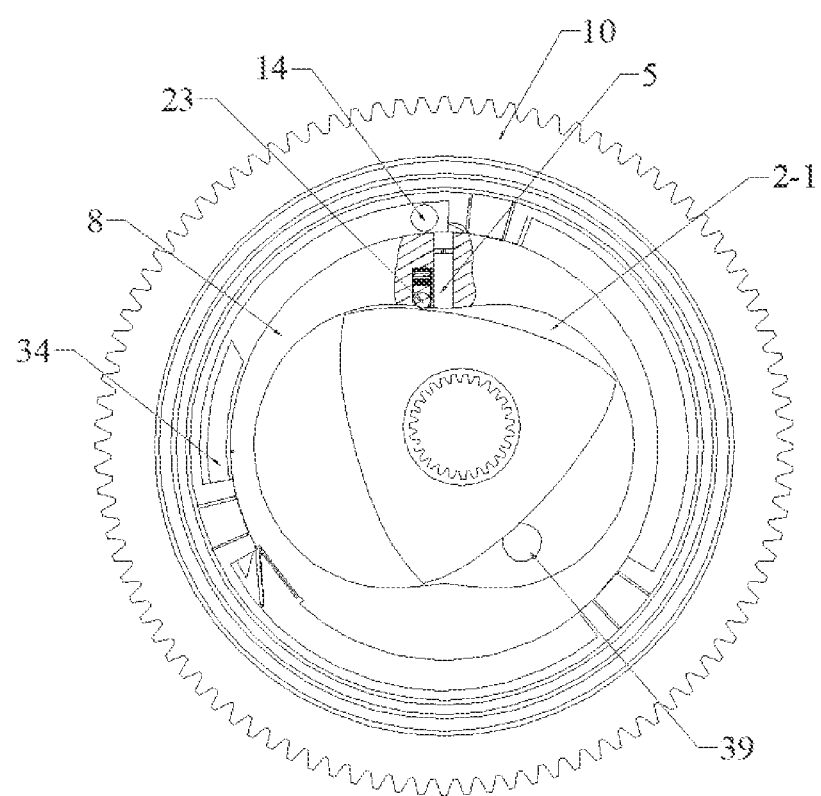
FIG. 14 is a schematic view of a certain moment in the compression process.

The compression stroke of the rotary piston engine according to the present invention is implemented as follows: the rotation of the piston gear plate 10 drives the first outer gear 18 to rotate, then the rotation of the first outer gear 18 drives the second outer gear 19 to rotate, then the rotation of the second outer gear 19 drives the third outer gear 20 to rotate, then the rotation of the third outer gear 20 drives the main shaft 3 of the rotor 1 to rotate, and then the rotation of the main shaft 3 of the rotor 1 drives the rotor 1 to rotate. The rotation of the rotor 1 continuously reduces the volume of the compression chamber 2 which has completed the intake process, thereby compressing the fresh combustible gas mixture in the compression chamber 2. In this way, the compression process in the compression stroke of the engine of the present invention is realized. FIG. 14 is a schematic view of a certain moment in the compression stroke. The structure and rotation mode of the rotor 1 are completely the same as the structure and rotation mode of the triangular rotor in the existing Wankel rotary engine, so the specific structure and rotation process will not be described herein.

Figure 16:
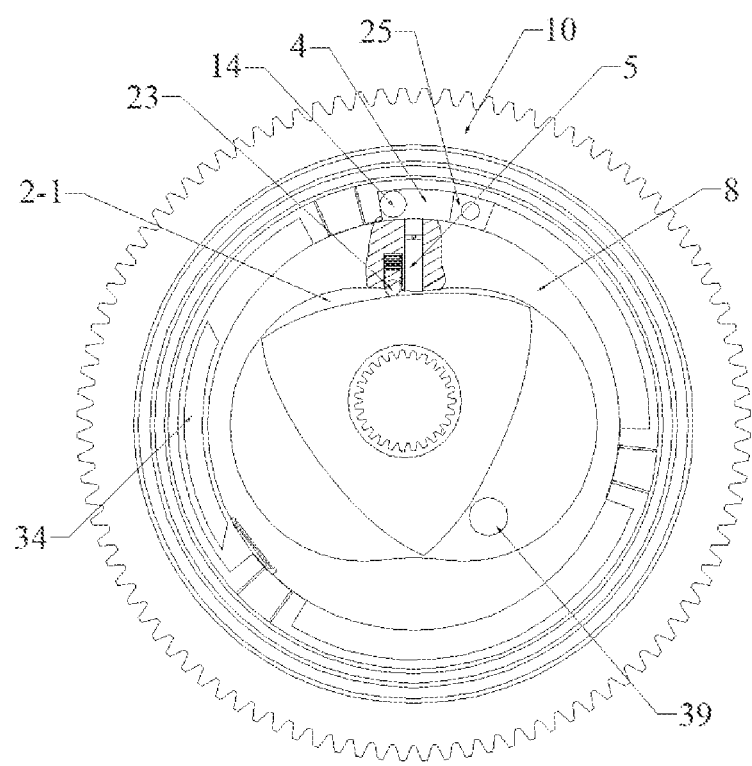
FIG. 16 is a schematic view of a certain moment in the combustion process.
Figure 17:
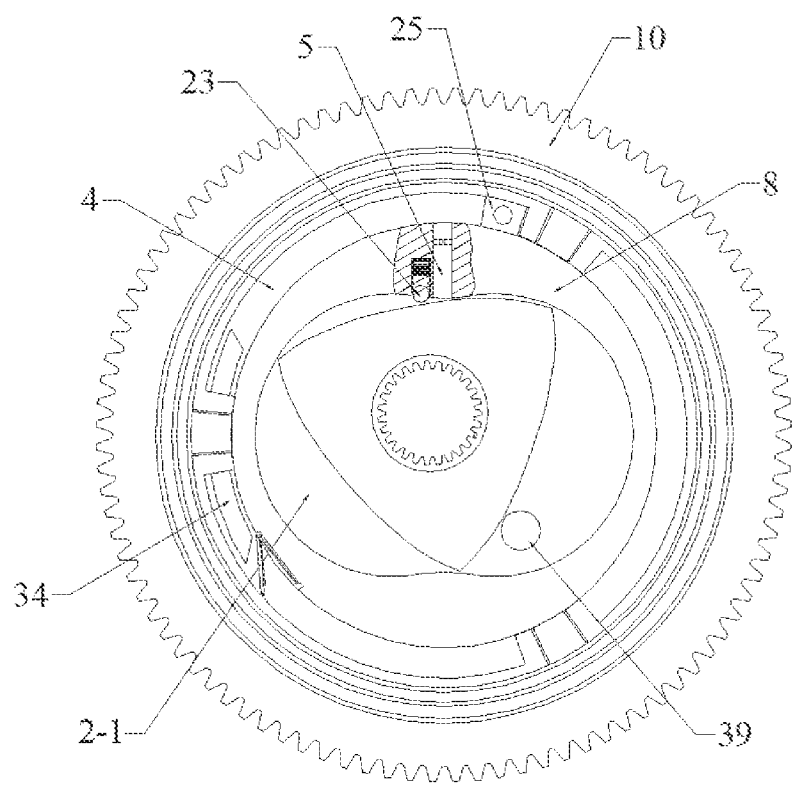
FIG. 17 is a schematic view of a certain moment in the exhaust process.

The combustion stroke of the rotary piston engine of the present invention is implemented as follows: when the rotor 1 rotates to a top stop point, one support block 15 just passes over the position of the compressed gas passage 5, and at this point, the valve 13 is opened under the action of the electronic control system. As the rotor 1 continues to rotate, the compressed combustible gas mixture in the compression chamber 2 is squeezed into the combustion chamber 4 via the compressed gas passage 5 under the pushing action of the rotor 1 and the blocking action of the first pin roller 23. When the rotor 1 passes over the top stop point by a small angle, the valve 13 is closed under the action of the electronic control system, and the compressed gas mixture no longer enters the combustion chamber 4. In this way, the process of entering of the compressed combustible gas mixture into the combustion chamber in the engine of the present invention is realized. FIG. 15 is a schematic view of a certain moment in the process of entering of the compressed combustible gas mixture into the combustion chamber 4. In the above process that the gas mixture enters the combustion chamber 4 from the compression chamber 2, the opening and closing of the valve 13 is controlled by the electric control system according to a crank angle signal. In addition, the above process that the gas mixture enters the combustion chamber 4 from the compression chamber 2 is very short. Therefore, during the rotation of the piston gear plate 10, the volume of the combustion chamber 4 formed between the support block 15 on the left of the directional valve 28 and the directional valve 28 is very small. At this point, after being ignited by the spark plug 14, the combustible gas mixture in the combustion chamber 4 rapidly burns and expands, generating huge pressure inside the combustion chamber 4. Meanwhile, since the position of the directional valve 28 is fixed, the combustion pressure pushes the support block 15 on the left of the directional valve 28 to rotate in the counterclockwise direction in the embodiment. In this way, the combustion of the compressed combustible gas mixture in the combustion stroke of the engine of the present invention is realized. FIG. 16 is a schematic view of a certain moment in the combustion stroke.

The exhaust stroke of the rotary piston engine of the present invention is implemented as follows: exhaust gas generated after the combustion stroke remains in the combustion chamber 4, and as the rotation of the piston gear plate 10 continues, the combustion chamber 4 becomes in communication with the exhaust passage 34, so that the exhaust gas is naturally discharged via the exhaust passage. With the fast rotational speed of the engine, the exhaust gas that is not naturally discharged in time is discharged via the exhaust passage 34 under the squeezing action of the paddle plate 35. In Embodiment 2 of the present invention, the exhaust gas that is not discharged in time is forcibly discharged via the exhaust passage 34 under the action of the piston at one end of the piston rod 41. In this way, the gas exhaust in the exhaust stroke of the engine of the present invention is realized. FIG. 16 is a schematic view of a certain moment in the exhaust stroke according to Embodiment 1 of the present invention.

The embodiments are preferred embodiments of the present invention, but the present invention is not limited to the above-mentioned embodiments. Without departing from the spirit of the present invention, any obvious improvement, replacement or variation that can be made by the person skilled in the art belongs to the protection scope of the present invention.

What is claimed is:

1. A rotary piston engine, comprising a shell and a rotor, wherein
    the rotor is arranged in the shell and the rotor is configured to divide a rotor cavity into compression chambers each with a variable volume,
    a plurality of combustion chambers rotating around a main shaft of the rotor are arranged on an outer ring of the shell, and a combustion chamber of the plurality of combustion chambers is communicated with the compression chambers,
    the plurality of combustion chambers are in a transmission connection with the main shaft via a transmission system, and
    each of the plurality of combustion chambers drives the main shaft to rotate through a combustion of a compressed gas.

2. The rotary piston engine according to claim 1, wherein the shell comprises an upper cylinder cover and a lower cylinder cover, and a boss of the upper cylinder cover is fitted with a spigot of the lower cylinder cover;
    a rotatable piston gear plate is arranged between the upper cylinder cover and the lower cylinder cover, support blocks are evenly distributed on an inner ring of the rotatable piston gear plate, and the support blocks are in contact with the boss in a manner of a rolling pair;
    a cavity among the boss, the lower cylinder cover and adjacent two of the support blocks is the combustion chamber; and
    the rotatable piston gear plate is in the transmission connection with the main shaft via the transmission system.

3. The rotary piston engine according to claim 2, wherein a bottom of each of the support blocks is in contact with a surface of the boss in a manner of the rolling pair, and two end faces of the rotatable piston gear plate are respectively connected to the upper cylinder cover and the lower cylinder cover via a plane bearing.

4. The rotary piston engine according to claim 2, wherein a wall surface of the rotor cavity is provided with a roller groove, a cylinder bearer is arranged in the roller groove, a first pin roller is mounted at a bottom of the cylinder bearer, and a first spring is mounted between the roller groove and the cylinder bearer for keeping the first pin roller in contact with an outer surface of the rotor during rotation of the rotor.

5. The rotary piston engine according to claim 2, wherein a first sealing assembly is provided between each of two end faces of the rotatable piston gear plate and a respective one of the upper cylinder cover and the lower cylinder cover,
    a second sealing assembly is provided on each of the support blocks, and the each of the plurality of combustion chambers is sealed by the second sealing assembly and the first sealing assembly.

6. The rotary piston engine according to claim 2, wherein a directional valve is mounted on the upper cylinder cover near a spark plug,
    a first end of the directional valve is located inside one of the plurality of combustion chambers close to the spark plug, and the directional valve is configured for causing the one of the plurality of combustion chambers close to the spark plug to rotate in a fixed direction and causing a volume of the one of the plurality of combustion chambers to change periodically;
    a second end of the directional valve is connected to the rotatable piston gear plate via a rotary slider mechanism for causing the directional valve to avoid the support blocks and undergo a lifting movement.

7. The rotary piston engine according to claim 6, wherein the rotary slider mechanism comprises a protruding disk and guide blocks; wherein
    the guide blocks having identical phase angle as the support blocks are provided on the protruding disk,
    the protruding disk rotates synchronously with the rotatable piston gear plate, and during a synchronous rotation,
    a guide block of the guide blocks is in contact with the second end of the directional valve to lift the directional valve up.

8. The rotary piston engine according to claim 2, further comprising an exhaust device, wherein
    the exhaust device is mounted on the shell, and the exhaust device contacts an inner wall of the combustion chamber for a forced exhaust by a rotation of the plurality of combustion chambers.

9. The rotary piston engine according to claim 8, wherein the exhaust device comprises a piston, a piston rod, a second return spring and a cam mechanism;
    the shell is provided with a piston rod groove in communication with the combustion chamber,
    the piston at a first end of the piston rod enters the combustion chamber through the piston rod groove, and is in contact with the inner wall of the combustion chamber,
    a second end of the piston rod is connected to the cam mechanism, and the piston rod reciprocates in the piston rod groove under an action of the cam mechanism; and
    the second return spring is mounted on the piston rod to ensure the second end of the piston rod is in contact with the cam mechanism.

10. The rotary piston engine according to claim 8, wherein the exhaust device comprises a paddle plate and a second spring, wherein
   a paddle groove is provided on a stepped surface of the boss,
   a first end of the paddle plate is mounted in the paddle groove by a revolute pair, and
   the second spring is provided between the paddle groove and the paddle plate and the second spring is configured for causing a second end of the paddle plate to contact the inner wall of the combustion chamber.

11. The rotary piston engine according to claim 3, wherein
   a directional valve is mounted on the upper cylinder cover near a spark plug,
   a first end of the directional valve is located inside one of the plurality of combustion chambers close to the spark plug, and the directional valve is configured for causing the one of the plurality of combustion chambers close to the spark plug to rotate in a fixed direction and causing a volume of the one of the plurality of combustion chambers to change periodically;
   a second end of the directional valve is connected to the rotatable piston gear plate via a rotary slider mechanism for causing the directional valve to avoid the support blocks and undergo a lifting movement.

12. The rotary piston engine according to claim 4, wherein
   a directional valve is mounted on the upper cylinder cover near a spark plug,
   a first end of the directional valve is located inside one of the plurality of combustion chambers close to the spark plug, and the directional valve is configured for causing the one of the plurality of combustion chambers close to the spark plug to rotate in a fixed direction and causing a volume of the one of the plurality of combustion chambers to change periodically;
   a second end of the directional valve is connected to the rotatable piston gear plate via a rotary slider mechanism for causing the directional valve to avoid the support blocks and undergo a lifting movement.

13. The rotary piston engine according to claim 5, wherein
   a directional valve is mounted on the upper cylinder cover near a spark plug,
   a first end of the directional valve is located inside one of the plurality of combustion chambers close to the spark plug, and the directional valve is configured for causing the one of the plurality of combustion chambers close to the spark plug to rotate in a fixed direction and causing a volume of the one of the plurality of combustion chambers to change periodically;
   a second end of the directional valve is connected to the rotatable piston gear plate via a rotary slider mechanism for causing the directional valve to avoid the support blocks and undergo a lifting movement.

14. The rotary piston engine according to claim 3, further comprising an exhaust device, wherein
   the exhaust device is mounted on the shell, and the exhaust device contacts an inner wall of the combustion chamber for a forced exhaust by a rotation of the plurality of combustion chambers.

15. The rotary piston engine according to claim 4, further comprising an exhaust device, wherein
   the exhaust device is mounted on the shell, and the exhaust device contacts an inner wall of the combustion chamber for a forced exhaust by a rotation of the plurality of combustion chambers.

16. The rotary piston engine according to claim 5, further comprising an exhaust device, wherein
   the exhaust device is mounted on the shell, and the exhaust device contacts an inner wall of the combustion chamber for a forced exhaust by a rotation of the plurality of combustion chambers.

\* \* \* \* \*